Patented Mar. 31, 1942

2,278,297

UNITED STATES PATENT OFFICE 2,278,297

HANDLING THERMOPHORE MIXTURES

Hugh Wood, Beaumont, Tex., assignor to Socony-Vacuum Oil Company, Incorporated, New York, N. Y., a corporation of New York No Drawing. Application October 16, 1941, Serial No. 415,251

2 Claims. (Cl. 252—71)

This invention has to do with methods for the handling of molten inorganic salt mixtures used as fluid heat transfer media in industrial processes. Several forms of such media are used. A quite popular material is a mixture of the nitrogen acid salt of alkali metals, such as a mixture of sodium and potassium nitrates and nitrites. Other mixtures, such as various combinations of chlorides, are similarly used. Most of these salt mixtures undergo some degradation or change in chemical nature during use, which alters their physical properties and causes a necessity for periodic withdrawal of a portion, or all, of the salt from the system for reconditioning. For example, the mixture of nitrogen acid salts of alkali metals is prone to the formation of carbonates by absorption of carbon dioxide, which results in an increase in the melting point. Such regenerations as are necessary are frequently practiced in aqueous solutions. Upon the return of the regenerated or reconditioned salt to the system, which is at a temperature well above that at which water will be expelled from the aqueous mixture, considerable trouble is frequently experienced from the evaporation of this water.

This invention has for its object the provision of a method for the introduction of concentrated aqueous solutions of inorganic salts to fused compositions of such inorganic salts, which are at temperatures well above those at which water is driven off, with a minimizing of difficulty from spattering and other effects arising from the dewatering of the added salt.

While the invention is not limited thereto, it can be conveniently explained by reference to a thermophore salt mixture comprising about 53% potassium nitrate, about 7% sodium nitrate, and about 40% sodium nitrite. Such a mixture, in the anhydrous form, has a melting point of about 295° F. Since these thermophore mixtures are usually used in systems where temperatures are too high for use of organic heat transfer media, the system temperature at which the salt in use is circulated is usually of the nature of 800°–1000° F. or possibly even higher. A regenerated or reconditioned batch of this salt can be readily concentrated in the usual handling, to a water content of about 30%, say 25 pounds of water per hundred pounds of salt. Such a mixture boils at about 270° F. It is obvious that the introduction of such a mixture, even in rather small amounts, to a working fused thermophore salt at a temperature of 800° F. would be quite troublesome. The admixture of anhydrous salt to such a mixture in equal amounts, to give 12.5 pounds of water per 100 pounds of salt will raise the boiling point of the mixture only to about 300° F. Additional increases in the amount of anhydrous salt, or conversely, decreases in the water content, raise the boiling point. For example at 5 pounds water per 100 pounds of salt, it is about 355° F. and at 2.5 pounds water, it is about 400° F. These do not seem sufficiently great to alleviate the spattering and other steam evolution troubles.

This invention is based upon the discovery that, contrary to the apparent meaning of this data, if the aqueous salt mixture is blended off with sufficient anhydrous salt to bring its water content down to about 5 pounds of water per hundred pounds of salt and this mixture heated to just above its melting point, which is about 240° F., the mixture may be bled into a circulating stream of much hotter salt without serious troubles from steam evolution. It is necessary that the mixture be added to the working or circulating thermophore mixture at a rather slow rate, for example, in a system circulating 2,250,000 pounds of salt per hour at a temperature of 840° F., it will be possible to add 72,000 pounds of reconditioned salt mixture, containing 5 pounds of water per hundred pounds of anhydrous salt, over a period of about 8 hours without serious trouble from steam evolution.

It will be seen that this method offers a convenient and ready method for the return of such aqueous salt mixture to the system without trouble. The anhydrous salt used can be either fresh salt being introduced as makeup, or it may be system salt which has been withdrawn purposely for use in returning regenerated salt.

The limit to which blending should be carried, as determined by the water content of the reintroduced salt will vary somewhat with the type of system for any particular salt, and with the type of salt. In general, for any salt mixture of the type here spoken of there is a water content at which aqueous salt can be fused and introduced into a much hotter non-aqueous fused salt without spattering, etc. With alkali nitrate-nitrite mixtures the water content desirable is usually less than about seven per cent and preferably about five per cent by weight.

The permissible rate of reintroduction also is influenced by the apparatus system within which the thermophore salt is used, but in general will not be more than a few per cent, preferably less than one per cent per hour, based on circulation. That is, for one hundred pounds of salt circulated per hour, preferably less than one pound per hour of the mixture of reconditioned salt, water, and anhydrous salt should be introduced.

The term boiling point, where used herein, refers to that temperature at which the water boils from the aqueous salt mixture.

I claim:

1. In a system employing as a circulating heat transfer medium a fused inorganic salt composition at elevated temperatures, the method of adding aqueous mixtures of said salt to said system which comprises the steps of mixing anhydrous salt with aqueous salt in quantity sufficient to reduce the aqueous content of the resultant mixture to an amount of the order of five per cent, heating the resultant mixture to a temperature between its melting point and that at which water is expelled therefrom, and introducing it directly into the circulating composition which is at a temperature substantially above that necessary to expel water from the added mixture.

2. In a system employing as a circulating heat transfer medium a fused inorganic salt composition comprising alkali nitrates and nitrites at elevated temperatures, the method of adding aqueous mixtures of said salt to said system which comprises the steps of mixing anhydrous salt with aqueous salt in quantity sufficient to reduce the aqueous content of the resultant mixture to an amount of the order of five per cent, heating the resultant mixture to a temperature between its melting point and that at which water is expelled therefrom, and introducing it directly and in regulated small amounts into the circulating composition which is at a temperature substantially above that necessary to expel water from the added mixture.

HUGH WOOD.